Aug. 20, 1957 H. D. COBURN 2,803,731

INDUCTION SOLDERING MACHINE

Filed Oct. 15, 1954

INVENTOR
Herbert D. Coburn

BY Stevens, Davis, Miller & Mosher
ATTORNEYS

United States Patent Office 2,803,731
Patented Aug. 20, 1957

2,803,731

INDUCTION SOLDERING MACHINE

Herbert D. Coburn, Dallas, Tex., assignor to Texas Instruments Incorporated, Dallas, Tex., a corporation of Delaware Application October 15, 1954, Serial No. 462,579
13 Claims. (Cl. 219—9.5)

Figures 1, 2:
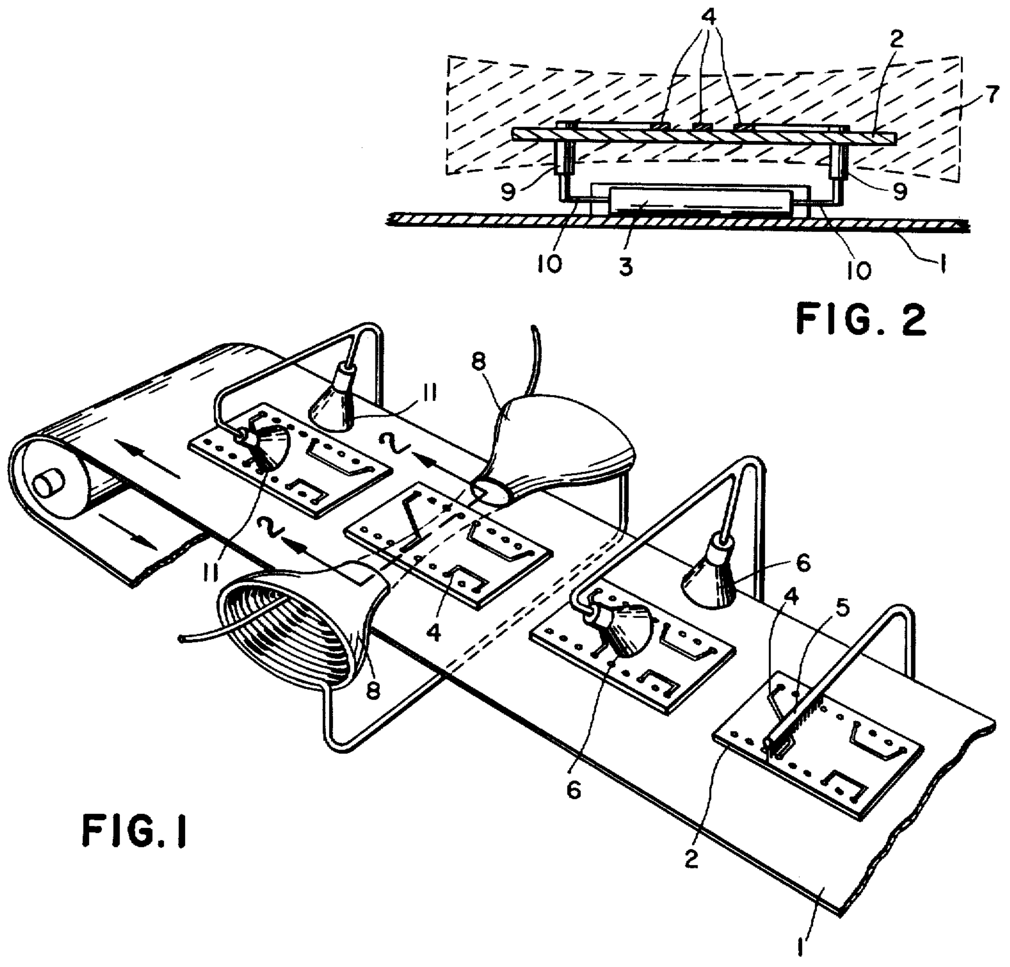

Some of the most time-consuming and inefficient operations in the manufacture of electronic equipment are the mounting and permanent attachment by soldering of wiring and components such as resistors, capacitors, and inductors in the assembly of the equipment. Because of the nature of these operations and the manner in which they have been carried out, they contribute heavily to the final cost of the equipment.

One recent development which reduces the time required for these operations is so-called "printed wiring." By the various printed wiring processes the connections between components mounted on a common insulating member, such as terminal board, are accomplished by thin strips of metal, usually copper, attached by some means to the surface of the insulating member. The components are usually mounted on hollow terminals or eyelets which extend through the board and contact the various strips of the printed wiring. The component leads may be cut and formed in such a manner that, when the components are mounted by pasing each of the leads through a terminal until the ends are flush with the opposite surface of the board, the component is suspended just above the top surface of the board.

It is at present the practice to solder the leads in place either individually with a conventional soldering iron or all in one operation by immersing the lower surface of the board in molten solder. The former method is slow and requires skilled personnel. The latter method has not yet been developed to the point where a satisfactory yield of acceptable solder joints will be insured unless highly trained personnel are used. Dip-soldering methods also tend to overheat the components to an extent that failures become excessive. This overheating occurs because the entire board must be subjected to the temperature of molten solder, usually about 450° F. In many cases, dip-soldering introduces terminal board warpage caused by the uneven expansion due to the difference in temperature between the surface contacting the solder and the surface remaining exposed to the air. In both of the above mentioned methods, operators are in danger of burns resulting from contact with soldering irons and molten solder and of poisoning from lead fumes which may be inhaled by the operators when working so close to quantities of molten solder.

It is an object of the present invention to provide a novel process for induction soldering which will greatly reduce the time required for a soldering operation over that previously required.

It is a further object of this invention to provide a novel process for conducting a soldering operation utilizing an induction heating technique which can be carried out in a more rapid, efficient and economical manner than any process heretofore available.

It is another object of this invention to provide apparatus for induction soldering which is characterized by simplicity and compactness of design and which is capable of efficient and economical operation to produce soldered components rapidly.

It is a still further object of this invention to provide apparatus for soldering components in place on printed wiring type terminal boards quickly without overheating the components.

It is another object of this invention to provide apparatus for quick soldering which can be operated by unskilled personnel.

It is still another object of this invention to reduce the poisoning and burning danger to operators and other personnel in the vicinity of the soldering operations.

Other and further objects of the present invention will become more fully apparent from the following detailed description when taken in conjunction with the appended drawings in which:

Figure 1 is a view in perspective illustrating the steps of the process and the apparatus employed for induction soldering; and Figure 2 is an enlarged sectional view along the line 2—2 of Figure 1.

Referring to the drawings, there will now be described the preferred form of the present invention. As shown, an endless belt 1 is provided to move the work to be soldered, as for example, printed wiring terminal boards 2 having components 3 mounted thereon, successively into each zone of treatment.

The boards 2 have been previously prepared with printed wiring 4 on their undersurface by any well known or acceptable technique. As is evident from the drawings the boards 2 are placed on endless belt 1 upside down or with their bottom surfaces up so that the printed wiring 4 is fully exposed and readily accessible to be treated. In this condition, the boards 2 are first introduced to a coating zone and in this zone they pass under a brush or sprayer 5 which functions to coat the underneath surface of each board 2 with a suitable flux in which are suspended very fine particles of a suitable solder. It will be appreciated that the selection of the type of flux and type of solder will be governed mainly by nature of the materials employed and joint desired. Since fluxes and solders and their properties and uses are well established, the proper selection can readily and easily be made by one skilled in this art. The member 5, if a sprayer, can consists of a closed end tube extending laterally across the belt 1 and provided with a plurality of perforations spaced along its length in the part of the tube in registry with the portions of belt 1 upon which the boards 2 are carried. The flux and solder are supplied to the tube in a fluid state from a suitable source (not shown).

The boards 2 after being coated by sprayer 5 are next introduced into a pre-heating zone. For this purpose a pair of heating lamps 6 are provided arranged to direct their energy onto the portions of belt 1 upon which the boards 2 are carried. The lamps 6 serve to pre-heat the boards 2 preparatory to the actual soldering step which pre-heating has been found to accelerate the action of the flux.

Next the boards 2 are introduced into the soldering zone and in this zone pass through a field of radio frequency energy 7 of a somewhat rectangular cross-section. This R.-F. beam is formed by paraboloids 8 which focus the output of an R.-F. generator, not shown. The field or beam 7 is so directed that only the board 2, the printed wiring 4, and the bottom part of hollow terminals 9 which assist in making connection between wiring 4 and components 3 pass through it. The components 3 and the top part of the terminals 9 pass beneath the beam as will be evident from Figure 2. The arrangement in Figure 2 shows a cross-sectional view of the field 7 and the board 2 with component leads 10 passing through the hollow terminals 9 for the purpose of attaching the components 3 with wiring 4. The insulating member (board 2) will be unaffected by the R.-F. energy, but, as the metallic parts pass through the beam, high circulatory currents are induced in them to such an extent that heating occurs. If sufficient power (2.5 to 5 kw.) and a suitable frequency (about 450 kc.) of R.-F. energy are used, the induced heating will be great enough to melt the particles of solder suspended in the flux. The molten solder will then flow to and cover the metallic parts and into the terminal holes thus forming the desired solder joints on cooling.

To insure against crystallized solder joints formed by rapid cooling, the boards 2, upon emerging from the R.-F. field, are introduced into a precooling zone and therein pass under heat lamps 11. The cooling time for the joints is thus extended sufficiently to avoid the formation of crystallized or 'cold" solder joints.

Although the process and apparatus herein described have been discussed with reference to a preferred embodiment, nevertheless, various changes and modifications obvious to one skilled in the art are within the spirit, scope, and contemplation of the invention.

What is claimed is:

1. A process for induction soldering which includes the steps of coating work to be soldered with a flux in which are suspended particles of solder, generating radio frequency energy, focusing the generated radio frequency energy into a beam of radio frequency energy, passing said work through said focused beam of radio frequency energy in a manner that only the coated portions of said work in which heating is desired actually pass through said focused beam of radio frequency energy, said beam inducing heating of the coated portions of said work when said portions actually pass through said focused beam to melt said particles of solder, and allowing said work to cool to form a soldered joint.

2. Apparatus for induction soldering an assembly which includes at least one heat sensitive component comprising means to coat the portion of said assembly to be soldered with a flux in which are suspended particles of solder, a radio frequency generator, means focusing the output from said radio frequency generator into a directed beam of radio frequency energy, and means conveying said assembly through said beam with said at least one heat sensitive component out of the path of said beam and said coated portion in the path of said beam to induce heating of said coated portion to melt said particles of solder and thereby ofrm a solder joint.

3. Apparatus for induction soldering as defined in claim 2 which includes means to pre-heat said coated poriton before said assembly is conveyed through said beam of radio frequency energy.

4. Apparatus for induction soldering as defined in claim 2 which includes heating means to extend the cooling time for said joint to avoid the formation of a crystallized solder joint.

5. Apparatus for induction soldering as defined in claim 2 wherein said focusing the output from said radio frequency generator into a directed beam of radio frequency energy are a pair of coils each in the form of a paraboloid.

6. Apparatus for induction soldering as defined in claim 2 in which said beam of radio frequency energy is at a frequency of about 450 kilocycles and of about 2.5 to 5 kilowattts in power.

7. Apparatus for induction soldering an assembly which includes at least one heat sensitive component comprising means to coat the portion of said assembly to be soldered with a flux in which are suspended particles of solder, a radio frequency generator, means focusing the output from said radio frequency generator into a directed beam of radio frequency energy, means conveying said assembly through said beam with said at least one heat sensitive component out of the path of said beam and said coated portion in the path of said beam to induce heating of said coated portion to melt said particles of solder and thereby form a solder joint, means to preheat said coated portion in advance of said assembly being conveyed through said beam, and heating means to extend the cooling time for said joint to avoid the formation of a crystallized solder joint.

8. A process for induction soldering an assembly which includes at least one heat sensitive component comprising the steps of coating the portion of said assembly to be soldered with a flux in which are suspended particles of solder, generating radio frequency energy, focusing the generated radio frequency energy into a beam of radio frequency energy, applying the said focused beam to said assembly so as to avoid said at least one heat sensitive component and to induce heating of said coated portion to melt said particles of solder, and allowing said coated portion to cool to form a soldered joint.

9. A process for induction soldering an assembly which includes at least one heat sensitive component comprising the steps of coating portion of said assembly to be soldered with a flux in which are suspended particles of solder, generating radio frequency energy, focusing the generated radio frequency energy into a beam of radio frequency energy, pre-heating said coated portion to accelerate the action of said flux, applying said focused beam to said assembly so as to avoid said at least one heat senstive component and to induce heating of said coated portion to melt said particles of solder, and allowing said coated portion to cool to form a soldered joint.

10. A process as defined in claim 8 wherein said coating step is carried out by spraying.

11. A process as defined in claim 8 wherein said coating step is carried out by brushing.

12. A process as defined in claim 8 wherein said beam of radio frequency energy is at a frequency of about 450 kilocycles and of about 2.5 to 5 kilowatts in power.

13. A process as defined in claim 9 which includes the further step of extending the cooling time for said joint to avoid the formation of a crystallized solder joint.

References Cited in the file of this patent

UNITED STATES PATENTS

| | | |
|---|---|---|
| 2,249,909 | Pisarev | July 22, 1941 |
| 2,279,854 | Whitney | Apr. 14, 1942 |
| 2,280,689 | Denneen et al. | Apr. 21, 1942 |
| 2,290,338 | Koehring | July 21, 1942 |

FOREIGN PATENTS

| | | |
|---|---|---|
| 264,814 | Great Britain | Dec. 22, 1927 |
| 424,057 | Italy | Sept. 4, 1943 |

UNITED STATES PATENT OFFICE

CERTIFICATE OF CORRECTION

Patent No. 2,803,731 August 20, 1957

Herbert D. Coburn

It is hereby certified that error appears in the printed specification of the above numbered patent requiring correction and that the said Letters Patent should read as corrected below.

Column 1, line 34, for "pasing" read -- passing --; column 2, line 43, for "consists" read -- consist --; column 3, line 15, for "'cold'" read -- "cold" --; line 46, for "ofrm" read -- form --; line 49, for "iton" read -- tion --; line 56, after "wherein said" insert -- means --.

Signed and sealed this 22nd day of October 1957.

(SEAL)

Attest:

KARL H. AXLINE

Attesting Officer

ROBERT C. WATSON

Commissioner of Patents